United States Patent
Schmid

(10) Patent No.: US 12,030,635 B2
(45) Date of Patent: Jul. 9, 2024

(54) COLOR-CHANGING COMPONENT FOR CABIN SURFACES

(71) Applicant: Diehl Aerospace GmbH, Ueberlingen (DE)

(72) Inventor: Frank Schmid, Poppenricht (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 18/140,256

(22) Filed: Apr. 27, 2023

(65) Prior Publication Data
US 2023/0348062 A1 Nov. 2, 2023

(30) Foreign Application Priority Data

Apr. 29, 2022 (DE) .......................... 102022110491.5

(51) Int. Cl.
*B64D 11/00* (2006.01)
*B32B 7/022* (2019.01)
*B32B 7/12* (2006.01)
*B64C 1/06* (2006.01)

(52) U.S. Cl.
CPC .......... *B64D 11/0015* (2013.01); *B32B 7/022* (2019.01); *B32B 7/12* (2013.01); *B64C 1/066* (2013.01); *B32B 2307/3065* (2013.01); *B32B 2457/20* (2013.01); *B64D 2011/0038* (2013.01)

(58) Field of Classification Search
CPC ........ B64D 11/0015; B64D 2011/0038; B32B 7/022; B32B 7/12; B32B 2307/3065; B32B 2457/20; B64C 1/066
See application file for complete search history.

(56) References Cited

U.S. PATENT DOCUMENTS

| | | | |
|---|---|---|---|
| 2020/0094985 A1* | 3/2020 | Quatmann | B64D 11/00151 |
| 2020/0183246 A1* | 6/2020 | Salandre | B60R 13/02 |

FOREIGN PATENT DOCUMENTS

| | | |
|---|---|---|
| DE | 102014005062 A1 | 4/2015 |
| DE | 102018127044 A1 | 4/2020 |

* cited by examiner

*Primary Examiner* — Elmito Breval
(74) *Attorney, Agent, or Firm* — Scully, Scott, Murphy & Presser, P.C.

(57) ABSTRACT

A component (6) for a passenger cabin (2) of a passenger aircraft (4) contains a base body (8) with a surface (10), and a layer structure (12), which is applied to the surface (10) and contains at least two layers in the form of at least one active layer (14) and an adhesive layer (16) arranged between the active layer (14) and the surface (10), wherein the active layer (14) contains at least one surface section (18a-c) which is formed from an electrically controllable colour-changing film (20), wherein at least a part of the colour-changing film (20) forms a visible surface (22) for the intended purpose in the passenger cabin (2).

14 Claims, 6 Drawing Sheets

COLOR-CHANGING COMPONENT FOR CABIN SURFACES

BACKGROUND OF THE INVENTION

The invention relates to a surface of a component, wherein the surface—in an intended assembled state of the component in a passenger cabin of a passenger aircraft—forms a visible surface in the passenger cabin. Such components or surfaces are, for example, a side wall or a ceiling of the passenger cabin or corresponding trim panels, a storage compartment, but also a PSU (Passenger Service Unit) or a sign, for example an illuminated display for a free or occupied state of a washroom.

DISCUSSION OF THE PRIOR ART

DE 10 2018 127 044 A1 discloses a panelling component for a cabin of a means of transportation, which has at least one display unit and at least one control unit, which are produced by printing and equipping at least one film, which is applied to a panelling element. The control unit can communicate wirelessly with an external electronic unit, and therefore the panelling component requires only one power connection to implement electronic functions. Functions can be added easily by replacing the at least one film. The display unit could have a screen based, for example, on OLED or a backlit TFT active matrix.

SUMMARY OF THE INVENTION

The present invention is directed to improvements in respect of such a component for a passenger cabin of a passenger aircraft.

The term "component" is to be understood broadly here and also includes functional elements or the surface/visible surface thereof. Such functional elements are, for example, display or operating elements of a PSU, such as a light switch, a call button for cabin crew, a seat belt/no-smoking sign, an operating element for entertainment media, etc. However, functional elements can also be lights, the surface of which is then a light-emitting surface; lights are, for example, displays, signs, accentuation lighting, etc.

The component is a component for a passenger cabin of a passenger aircraft, in particular a passenger cabin for the intended purpose. The component has a base body (also "base part"). The base body has a surface. The component contains a layer structure. The layer structure is attached to the surface of the base body or is fastened and held there. The layer structure contains at least two, in particular three or more, layers. One of the at least two layers is in any case an active layer. The other layer is in any case an adhesive layer. The adhesive layer is arranged between the active layer and the surface.

The active layer contains at least one surface section. "Surface" here refers to the layer-like nature of the active layer and could also be referred to as a layer section, partial region or the like. Each of the surface sections is formed from an electrically controllable color-changing film. The films of several or all sections can also be interconnected, i.e. be partial regions of a single film. As a result of the, in particular, electrical control or activation of the color-changing film, the latter changes its optical appearance, its optical properties, etc. "Color change" is to be understood here to mean also, for example, black-grey-white differences or different transparencies of the film. "Film" is also to be understood here in the sense of a "layer". In particular, however, it is actually a film, i.e. a flexible/deformable structure.

At least a part of the color-changing film forms a visible surface for the intended purpose in the passenger cabin. In other words, the color-changing film or an optical effect produced by its activation can be perceived by an observer on the visible side of the component. In particular, the color-changing film is thus only covered towards the visible side by layers of the layer structure that are optically at least partially transparent.

The abovementioned further layers can be located either between the active layer and the surface or alternatively on the other side of the active layer on the side thereof facing away from the surface. In particular, further adhesive layers are provided if two adjacent layers and/or the surface itself are not sufficiently adhesive, that is to say cannot be secured on one another sufficiently firmly to form a base body with a stable layer structure.

The surface is, in particular, a flat side of the component, for example a component in the form of a panel with an extensive surface area.

"For the intended purpose" means that, for example, the design of the component is matched to a specific, or specific type of, passenger cabin/aircraft and is configured for use there; being designed, for example, for the geometry requirements, etc., defined thereby. In other words, in particular a relevant passenger cabin/aircraft is assumed to be known in terms of its geometry, size, material properties, etc.

According to the present invention, a great variety of components is possible, making it possible to vary the appearance of the cabin. For this purpose, all that is necessary is to activate the color-changing film (in different ways). The latter changes its optical properties or its optical appearance—in particular also by interaction with other layers or the base body—and thus the appearance of the surface also changes.

In a preferred embodiment, the color-changing film is a non-self-luminous passive film, the transmittance and/or reflectance of which for (in particular visible) light can be changed. Such a film is, in particular, electronic paper, also known as "electronic-ink paper/film" or an electroluminescent film.

Alternatively, the color-changing film is a controllably light-emitting, i.e. in this case self-luminous, luminous film. Such a film is, for example, an OLED (display) film. "Self-luminous" means that this film optionally generates and emits light, or not, that is to say does so depending on its activation or operating mode, in particular through the supply of electric power. The film can thus actively generate and emit light. "Controllable" means that, depending on the control state, light is emitted or not or properties of the emitted light are controlled, for example its brightness/hue, etc.

Such color-changing films are particularly suitable for use in aircraft since they have only a comparatively low electrical energy consumption.

In a preferred embodiment, the active layer contains a plurality of surface sections of color-changing films, said sections being arranged side-by-side. "Side by side" means: in the plane of extent of the active layer/film. In particular, the surface sections are individually controllable. Thus, in particular, it is possible to implement displays, for example to selectively form different letters, words, symbols, arrows, etc., and to implement segment displays, etc.

In a preferred variant of this embodiment, at least two of the surface sections can be controlled individually (in particular electrically). The surface sections can thus be controlled independently of one another. This allows multifarious configuration of optical effects and, for example, the implementation of the abovementioned segment displays.

In a preferred embodiment, the layer structure contains a fire-retardant layer as one of its layers. This is arranged, in particular, between the surface and the active layer. In this way, it is possible, in particular, to meet safety requirements in aviation.

The background to this embodiment is as follows: for aircraft which are designed for more than 20 passengers, the "Heat Release Test" according to FAR/CS 25.853 APPENDIX F, PART IV/V must be passed for cabin parts that are larger than one square foot (approx. 30×30 cm=0.09 m$^2$). In this test, a sample of about 15×15 cm in size of a layer structure, that is to say, for example, of the present component, is ignited with a pilot flame in an environment which is at about 800° C. In the following two minutes, a maximum surface energy of 65 kWmin/m$^2$ may then be emitted, while at the same time a peak value of 65 kW/m$^2$ may not be exceeded.

The invention is now based on the following concept: in order to ensure that the abovementioned heat release test is passed, large-area cabin parts should be constructed in a specific manner. A transparent fire protection layer (e.g. made of glass) on the front side (that facing the interior) would be conceivable. The invention is based on the realisation that such a layer could be inadequate. Because this should or can only be made very thin (<1 mm) for weight reasons, it may splinter or break under the action of heat during the heat release test. As a result, the test is not passed.

Therefore, the invention is based on the concept of introducing an additional fire-retardant layer into the structure, i.e. the component according to the invention, as a measure. As a result, the heat release test is then passed.

In a preferred embodiment, at least a part of the fire-retardant layer contains an ablatively fire-retardant material. In particular, the entire fire-retardant layer contains an ablatively fire-retardant material. In particular, the entire fire-retardant layer is an ablatively fire-retardant layer.

"Ablative" means that the fire protection coating/layer has a cooling effect. It contains water bound in crystalline form, which evaporates under the action of heat and thus cools the system coated therewith, that is to say in this case the layer structure and thus the component. This delays an increase in temperature caused by the fire. As a result, the heat release test is then passed (with better results).

In a preferred embodiment, the fire-retardant layer and the adhesive layer form a common combination layer.

This embodiment is based on the consideration that—especially ablative—fire protection layers or the materials thereof have only a very or comparatively low bonding or adhesive effect. Thus, in the case of systems built up in layers, detachment or delamination could occur. To prevent this, the fire protection layer is combined with the adhesive layer. In this case, the adhesive portion provides an improved adhesive effect between adjacent layers; the fire-retardant portion brings about the improvements with respect to the abovementioned heat release test. Thus, the combination layer fulfils both tasks, namely sufficient adhesion between adjacent layers and adequate fire protection.

In a preferred embodiment, the combination layer contains partial surfaces arranged side-by-side. At least one of the partial surfaces is at least one section of the adhesive layer; at least one of the partial surfaces is at least one section of the fire-retardant layer. As a result, the combination layer thus contains or consists of surface sections in the form of fire-retardant surface sections, on the one hand, and adhesive surface sections, on the other hand.

This embodiment is based on the concept of embodying or applying the fire-retardant, in particular ablative, layer not over the entire surface but with defined free surfaces. At least some of the free surfaces, in particular all of them, are then "filled" with suitable adhesive, that is to say embodied as adhesive sections of the combination layer. The latter then impart the—at least improved—adhesion between two adjacent layers in the structure/layer structure/component.

In a preferred embodiment, the layer structure contains a protective layer for the active layer as one of its layers. The protective layer covers, in particular, the active layer on the side facing away from the surface, i.e. towards the visible side. In particular, a further adhesive layer is arranged between the active layer and the protective layer. As a result, the active layer is protected from damage from the visible side, for example from impacting objects and thus scratches, from shocks and thus breakage, etc.

In a preferred embodiment, the layer structure contains a concealment layer as one of its layers. This is also called a "hidden design" or "decor" layer. The hidden layer is designed to hide the active layer, at least temporarily. Thus, an observer viewing the component from the visible side does not recognize—during this time—that the active layer is hidden beneath the concealment layer. The concealment layer covers, in particular, the active layer on the side facing away from the surface. In particular, further adhesive layers are also provided here in order to incorporate the concealment layer in the layer structure. In particular, the concealment layer is combined with an active/self-luminous element as part of the component (active layer with luminous film, OLED film, self-luminous base body, etc., see below). The "at least temporary" concealment takes place, in particular, when the actively luminous element is switched off, i.e. is not itself emitting any light.

In a preferred variant of the abovementioned embodiments—if present in each case—the protective layer or the concealment layer is a final covering layer of the component. In other words, the corresponding covering layer is then that uppermost or last layer in the layer structure which forms the visible side of the component. The covering layer thus forms the effective surface of the entire component, including the layer structure, in this region. This results in particularly robust/optically appealing components.

In a preferred embodiment, the layer structure contains a touchpad layer as one of its layers. An input signal is available at the touchpad layer, indicating the touching of the touch layer or the visible side of the component/layer structure or a pressure on it. In other words, an input signal can thus be generated by pressure on the layer structure or the component by means of the touchpad layer, said signal reflecting this touch/pressure (or indeed no touch/pressure). In particular, the touchpad layer is arranged on the side of the active layer which faces away from the surface. In particular, further adhesive layers are also provided here in order to integrate the touchpad layer firmly in the layer structure. Here, the touchpad layer can provide both a single sensor field (input of a touch/a pressure) with respect to its plane of extent. However, it can also provide regional or areal information. In other words, the touchpad layer would respond either with a binary value (touch/pressure or not). Or, for example, a location/region of a touch on the touchpad layer or movements, etc., is/are also detected ("swiping movement", detection of one or more operating fingers of a person).

In a preferred embodiment, the layer structure contains as one of its layers a luminous layer which emits light in a controllable manner, i.e. is actively illuminated. In principle, this corresponds to the abovementioned luminous film but is, for example, in contrast to this, embodied uniformly over a surface area. In other words, in particular, it produces homogeneous backlighting during operation. This backlighting can then be structured by the active layer, in that the latter represents a backlit pattern/logo/text/symbol, for example.

In a preferred embodiment, the base body has, at least on its surface, in particular the entire base body, at least one actively illuminated section, which in particular forms the entire base body. The base body therefore forms, in particular, a light unit/a backlight. By application of the layer structure or by means of the active layer, the light-emitting surface (i.e. the surface of the base body) is changed in its effect towards the visible side (on the surface/visible side of the component or the layer structure). Thanks to the active layer, optically particularly appealing components can thus be achieved, even with comparatively simple illuminated base bodies.

An illuminated base body and integration of a luminous layer/luminous film into the layer structure are, in particular, alternatives to one another.

In a preferred embodiment, the component is a side wall, a ceiling, a wall of a luggage bin, a room divider, a partition, a PSU or a light unit or at least a respective part/section thereof. The room divider includes, in particular, class dividers or bulkheads. The light unit is, in particular, an accentuation light or a smart sign. Thanks to the active layer, particularly varied cabin surfaces or functional elements or their surfaces are thus created.

The invention is based on the following insights, observations or considerations and also has the following preferred embodiments. These embodiments are also referred to in some cases as "the invention" for the sake of simplicity. The embodiments may also contain parts or combinations of the abovementioned embodiments or correspond to them and/or optionally also include embodiments not previously mentioned.

According to the invention, a component is obtained in the form of a color-changing component for cabin surfaces and functional elements (i.e. the "components" under consideration in the broader sense, see above). In other words, according to the invention, layer structures with "display films" (active layer) are applied to cabin surfaces, that is to say to the surface of components (side wall, luggage bin, ceilings, class dividers, light units, etc.). The cabin appearance can thus be changed individually. Furthermore, this film can be placed in front of a light unit (luminous film, luminous layer, illuminated base body) in order to change the light-emitting surface.

The invention is based on the fundamental concept of individual adaptation of the cabin design or of cabin surfaces to customer requirements and the simultaneous compliance with aviation regulations, for example by the integration of fire protection layers.

Through the appropriate selection of an active layer, it is possible to achieve effects here which could be achieved in a comparable manner by means of a much more complex and expensive projection system which projects images onto cabin surfaces.

According to the invention, "electronic-ink films" or OLED display films in the form of the active layer are therefore applied to cabin surfaces (side wall, luggage bin, ceilings, class dividers, light units, etc.). The electronic-ink film is embodied as a display film (similar to standard electronic-ink readers for books, magazines, etc.). Furthermore, this film can be placed in front of a light unit, and the light-emitting surface can be changed. Alternatively, OLED display films can be used. This allows fast, electronic, optical modification of the cabin surfaces. The cabin appearance can thus be changed individually.

The use of electronic-ink films has the advantage of extremely low electrical powers since the electronic-ink films consume power only during the switching process (bistable).

By means of a special layer structure, i.e. selection and sequence of the layers, both official and customer-specific requirements can be met. This, in particular, permits use within the aircraft cabin.

Components are, in particular: PSU, side wall, ceiling panel, smart sign, e.g. indication of a washroom occupancy, storage compartment, accentuation light/seat row numbering, bulkhead/class divider.

For ceilings or panels, there is the possibility of a "smart decor" or the display of logos, for displaying passenger information, for advertising purposes with or without backlighting (luminous layer, illuminated base body, etc.). The same applies to a bulkhead/class divider and accentuation light/seat row indication as well as storage compartments and side walls. In the case of the latter, there may not be the possibility of backlighting because of the possibly limited spatial conditions.

For the PSU (passenger service unit), there is the possibility of displaying passenger information. Backlighting is as a rule always desirable. On the other hand, there is the choice of a touch functionality, for example to switch reading lights on and off.

The same properties are obtained for smart signs/placards. In addition, there is the possibility of advertising displays. The optional touch functionality also applies, for example, to a call button for cabin crew.

The fire protection layer or fire-retardant layer may be required in order to meet the official fire requirements of aviation. The protective layer may be required to meet official requirements (for example compatibility with detergents, pesticides, fungicides, certain acids and alkalis) and it is also required to meet customer-specific requirements (for example mechanical shock resistance).

The concealment layer or "hidden design" layer/decor may be required to meet customer-specific design requirements (for example in the off state of the display, the surface should not differ optically from adjacent cabin surfaces, applied pictograms, lettering, etc.).

The touchpad layer or the touch panel may be required if switching states are to be triggered by touching the component, for example in the form of a panel (for example switching on/off the reading light, call button for cabin crew (attendant call button), opening/closing the luggage bin, "afterglow" of touched surfaces).

Backlighting, in the form of an illuminated section or by integration of a luminous layer or an active layer in the form of a luminous film, may be necessary if the structure, i.e. the component, is to emit light; or is necessary in the case of non-self-luminous display technologies such as electronic ink; however, it is not necessary in the case of self-luminous display technologies such as OLED.

BRIEF DESCRIPTION OF THE DRAWINGS

Further features, effects and advantages of the invention will become apparent from the following description of a preferred exemplary embodiment of the invention and from the accompanying figures. Here, in each case in a schematic basic diagram.

DETAILED DESCRIPTION OF THE INVENTION

Figure 1:
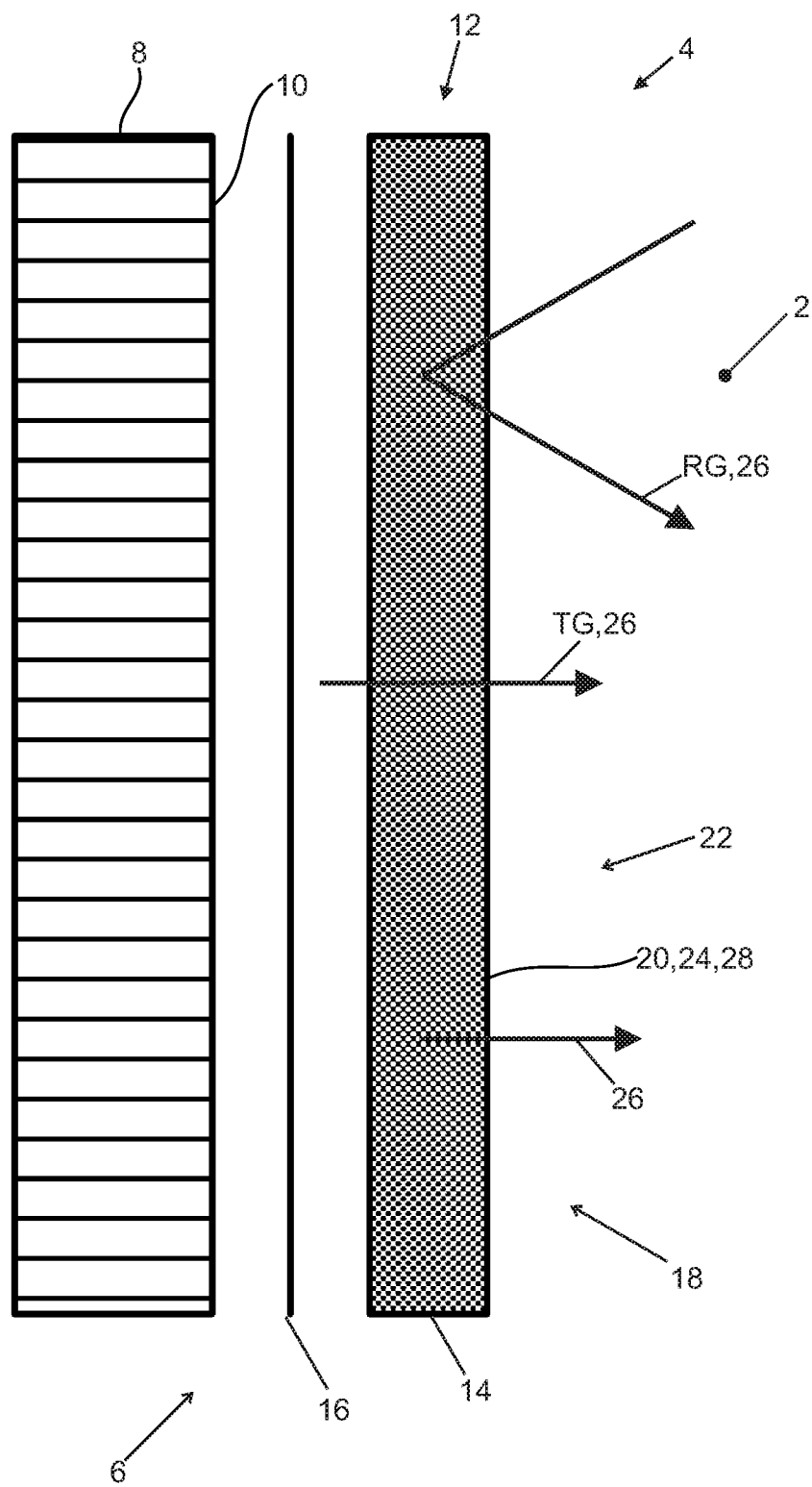
FIG. 1 shows a component according to a basic approach.

FIG. 1 shows what is referred to as a basic approach for the invention:

FIG. 1 shows a detail of a passenger cabin 2 of a passenger aircraft 4, neither of which is shown in detail. The passenger cabin 2 contains a component 6, here a panel of a side wall of the passenger cabin 2. The component 6 delimits the passenger cabin 2 (located to the right thereof in the figure) with respect to an outer wall (not shown in the figure, situated to the left of the component 6) of the passenger aircraft 4.

The component 6 has a base body 8. The base body 8 has a surface 10, which faces the passenger cabin 2. A layer structure 12 is attached to the surface 10. This contains an active layer 14. The layer structure 12 also contains an adhesive layer 16. This is arranged between the active layer 14 and the surface 10. The active layer 14 contains a surface section 18, which here occupies the entire surface of the active layer 14, that is to say the entire active layer 14. This surface section 18 is formed from an electrically controllable color-changing film 20. Here, the color-changing film 20 is a display film, in the example a passive film 24 in the form of a non-self-luminous electronic-ink film. The entire surface 10 provided with the layer structure 12 faces the passenger cabin 2 and forms the visible side of the component 6 for passengers. The color-changing film 20—in this case as the surface of the layer structure 12—is therefore a visible surface 22 for the intended purpose in the passenger cabin 2.

In the case of the passive film 24, its transmittance TG, indicated by an arrow and/or its reflectance RG, likewise indicated by an arrow, for light 26, can also be changed. This is accomplished by electrically activating the passive film 24.

Alternatively, the color-changing film 20 is a controllably self-luminous luminous film 28 which optionally generates and emits active light 26, here a self-luminous OLED film. In the case of the latter, it is possible to control both whether said film generates and emits light 26 at all, and also what type 26 the light 26 is, namely its brightness and color can be controlled. This too is accomplished by electrically activating the luminous film 28.

Figure 2:
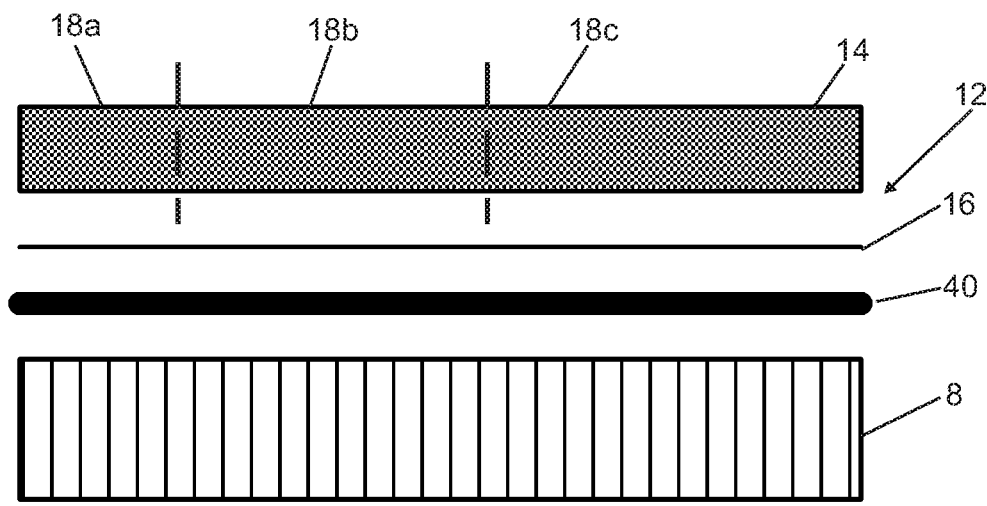
FIG. 2 shows an alternative component with a fire-retardant layer.

FIG. 2 shows in principle, but in modified form, the basic approach from FIG. 1. In addition, the layer structure 12 contains a fire-retardant layer 40, here between the active layer 14 and the surface 10. As an alternative, FIG. 2 shows an active layer 14 which has three surface sections 18a-c, which can be controlled independently of one another or individually in order, for example, to change the reflectance RG or transmittance TG thereof or to switch on or off the emission of light 26 of said sections or to change the type of light 26 emitted (color, brightness, etc.). In this case, the surface sections 18a-c can be constructed from the same or different color-changing films 20. For example, surface section 18a is formed from a passive film 24, and surface sections 18b,c are formed from a respective luminous film 28. In this case, surface sections 18a-c can be individually electrically activated in order to change their transmittance TG and reflectance RG (surface section 18a) as well as to generate light 26 or not or to change its character (surface sections 18b,c). FIG. 2 thus shows the basic approach plus fire protection layer for compliance with aviation requirements.

Figure 3:
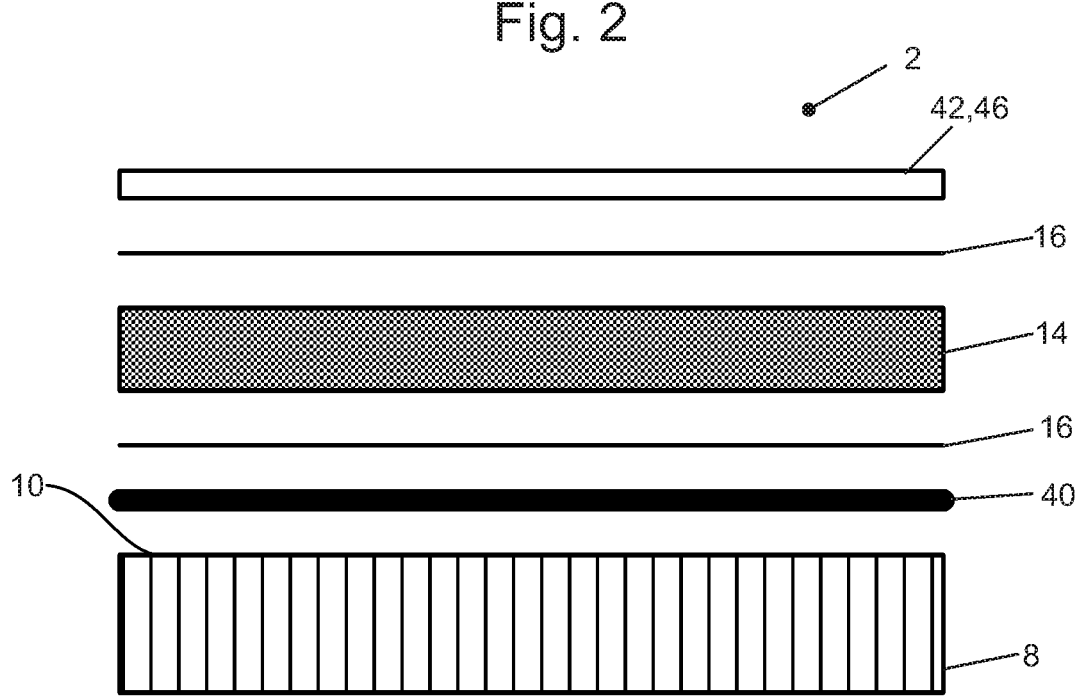
FIG. 3 shows an alternative component with a protective layer.

FIG. 3, on the other hand, actually shows the basic approach from FIG. 1, with the fire protection layer in the form of the fire-retardant layer 40 according to FIG. 2 and with an additional protective layer 42, which is applied to the corresponding opposite side of the active layer 14, facing away from the surface 10. An additional adhesive layer 16 is interposed here. FIG. 3 thus shows the basic approach plus fire protection layer plus surface protection layer for compliance with aviation requirements.

Figure 4:
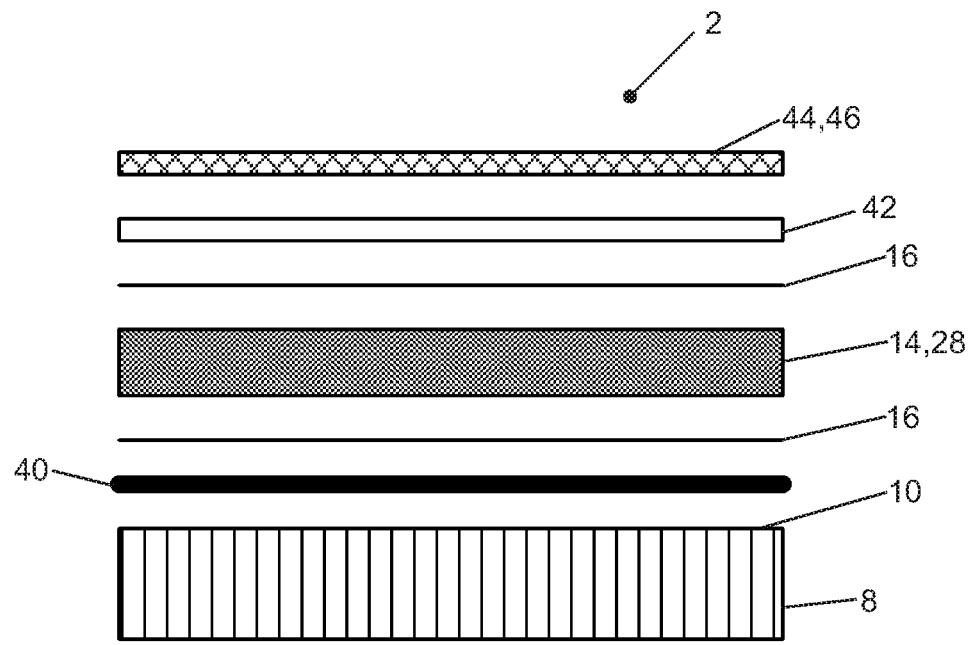
FIG. 4 shows an alternative component with a concealment layer.

FIG. 4 shows the structure of FIG. 3, wherein the protective layer 42 is covered towards the passenger cabin 2, i.e. facing away from the surface 10, by a further layer in the form of a concealment layer 44. This serves to hide the active layer 14 at least temporarily. The concealment layer 44 is also referred to as a "hidden design" layer. Here, the active layer 14 is a luminous film 28. In its switched-off state, the concealment layer 44 serves to make the component 6 appear optically identical to an adjacent conventional cabin component (not shown) for an observer from the passenger cabin 2. This does not contain a luminous film 28. Thus, the observer perceives a uniform wall covering in the passenger cabin 2 when the luminous film 28 is switched off, which wall covering contains the component 6 according to the invention in addition to conventional wall coverings. However, when the luminous film 28 is activated, the component 6 appears optically different from the other, surrounding wall components in that it serves to display passenger information. FIG. 4 thus shows the basic approach plus fire protection layer plus surface protection layer for compliance with aviation requirements plus design requirements.

In FIG. 3, the protective layer 42 forms a covering layer 46 of the component 6, which covers the component with respect to the passenger cabin 2. In FIG. 4, the concealment layer 44 forms the covering layer 46.

Figure 5:
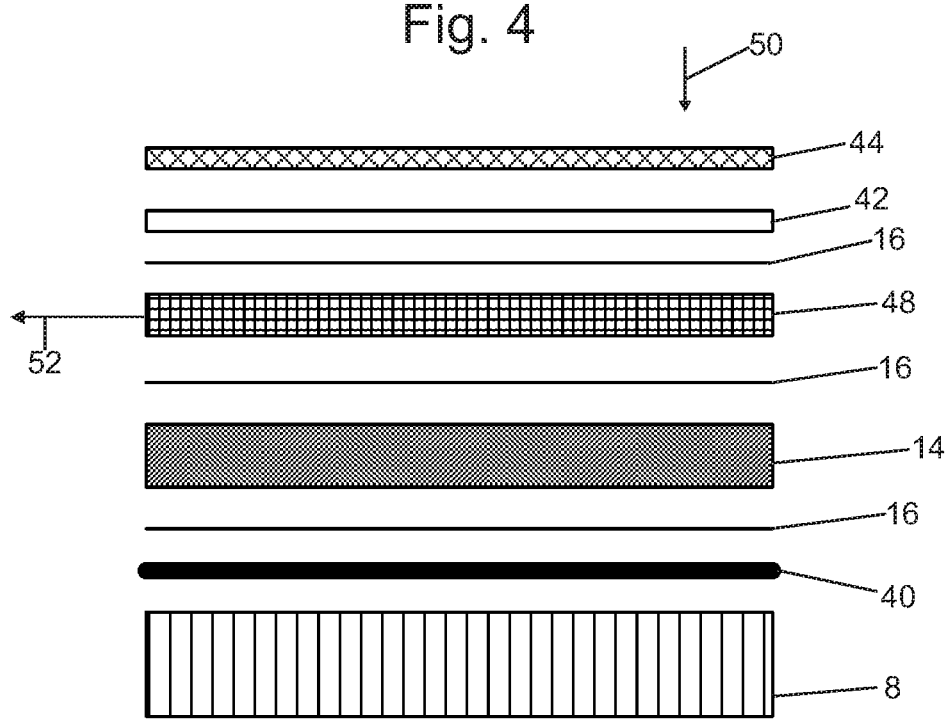
FIG. 5 shows an alternative component with a touchpad layer.

FIG. 5 shows a structure which is further expanded in comparison with FIG. 4. In this case, a touchpad layer 48 in the form of a touch panel is also integrated between the protective layer 42 and the active layer 14. In response to a touch (also pressure) 50, which is exerted on the component 6, as indicated by an arrow, an input signal 52 (indicated by an arrow) representing the touch 50 is available at the touchpad layer 48. This thus embodies an input of a user in the form of the touch 50 (a pressure).

Figure 6:
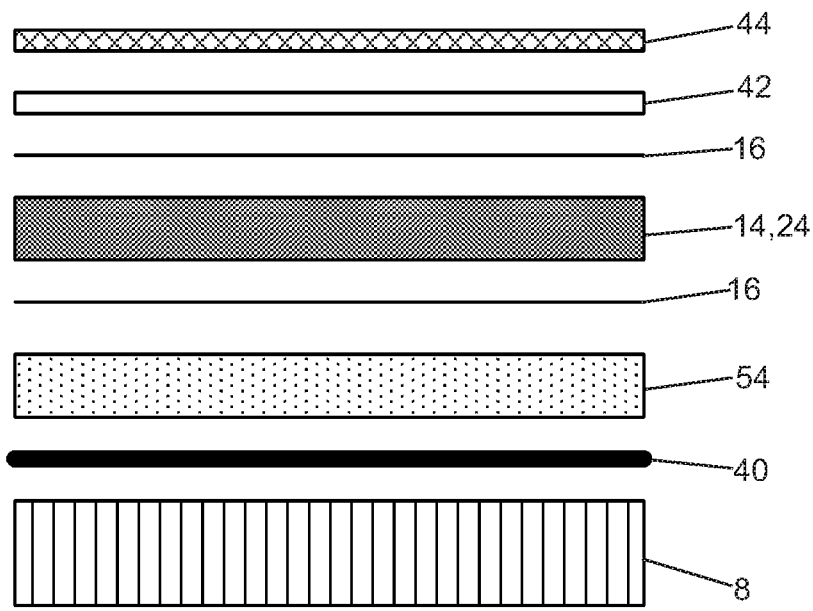
FIG. 6 shows an alternative component with a luminous layer.

FIG. 6 shows the structure of FIG. 4, wherein an actively illuminated luminous layer 54 is additionally contained in the layer structure 12. Here, this is what is referred to as a backlighting unit. In this embodiment, the active layer 14 is a passive film 24, in this case an electronic-ink film, which does not itself generate light 26. This design variant serves for what is referred to as "backlighting" plus fire protection layer plus surface protection layer for compliance with aviation requirements plus design requirements.

Figure 7:
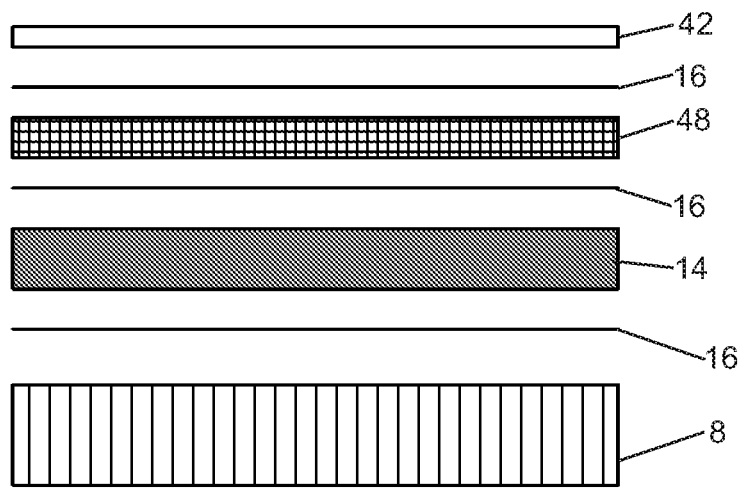
FIG. 7 shows an alternative component with a touchpad layer in a simplified embodiment.

FIG. 7 shows a simplified embodiment without a fire protection layer in the case of reduced fire protection requirements, with—as an alternative/not shown—also without a touchpad layer 48, for example for smart signs.

Figure 8:
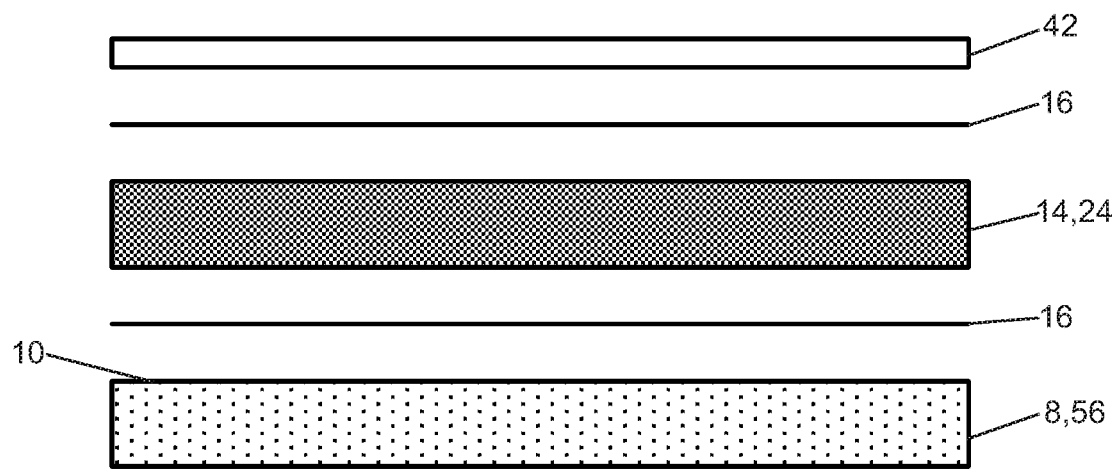
FIG. 8 shows an alternative component with an illuminated base body in a simplified embodiment.

FIG. 8 shows an embodiment which is again simplified in comparison with FIG. 7 and has an active layer 14 in the form of a passive film 24, in this case electronic ink, again without a fire protection layer in the case of reduced fire protection requirements, for example for smart signs, or PSUs. Here, the base body 8 itself has an actively illuminated section 56 on its surface 10, wherein in the example the section 56 is extended to or occupies the entire base body 8. Here therefore, the base body 8 or the base part is a backlighting unit.

Figure 9:
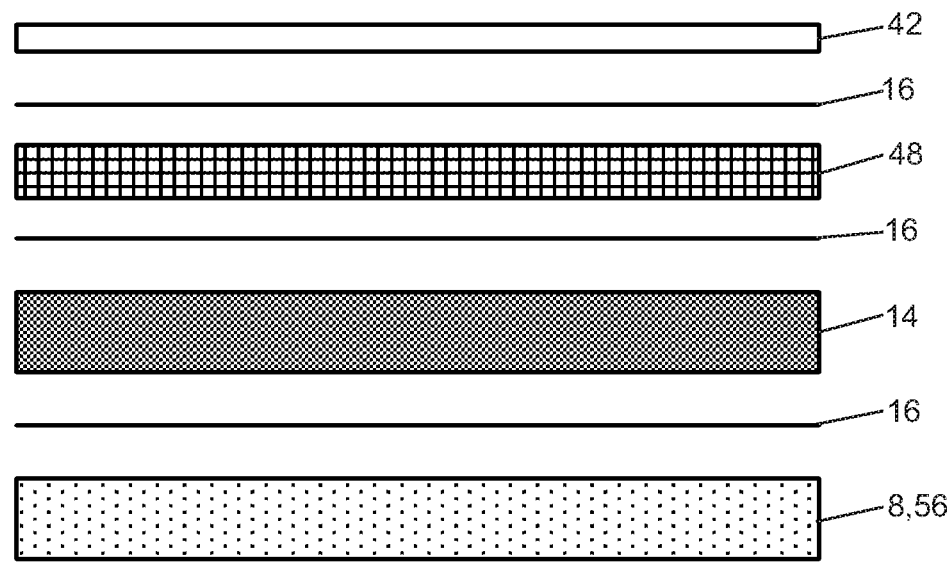
FIG. 9 shows an alternative component with a touchpad layer and an illuminated base body in a simplified embodiment.

FIG. 9 shows a likewise simplified embodiment of a component 6 since, here too, the base body 8 is embodied as an illuminated section 56 and the fire protection layer is missing. Compared to FIG. 8, however, a touch panel in the form of a touchpad layer 48 is again integrated here, for example for smart signs or a PSU.

Figure 10:
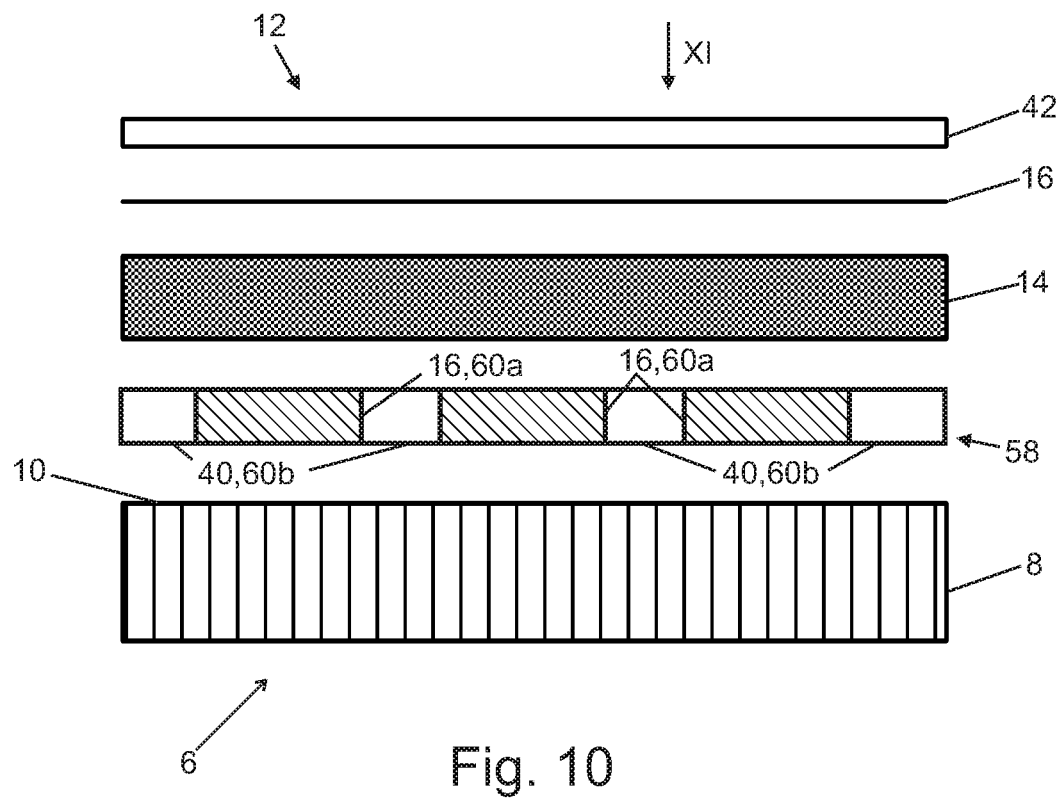
FIG. 10 shows an alternative component with a combination layer, in each case in cross section.

FIG. 10 shows an alternative component 6, which is basically constructed according to FIG. 3 with a base body 8 having a surface 10 and a layer structure 12 having a protective layer 42, an active layer 14 and an adhesive layer 16 lying in between. Here, however, a combination layer 58, which is likewise part of the layer structure 12, is arranged between the surface 10 and the active layer 14. The combination layer 58 contains or is formed by, on the one hand, a fire-retardant layer 40 and, on the other hand, by a further adhesive layer 16. Here, the fire-retardant layer 40 is an ablatively fire-retardant layer, and thus a fire-retardant layer which has a comparatively low adhesive capacity.

Figure 11:
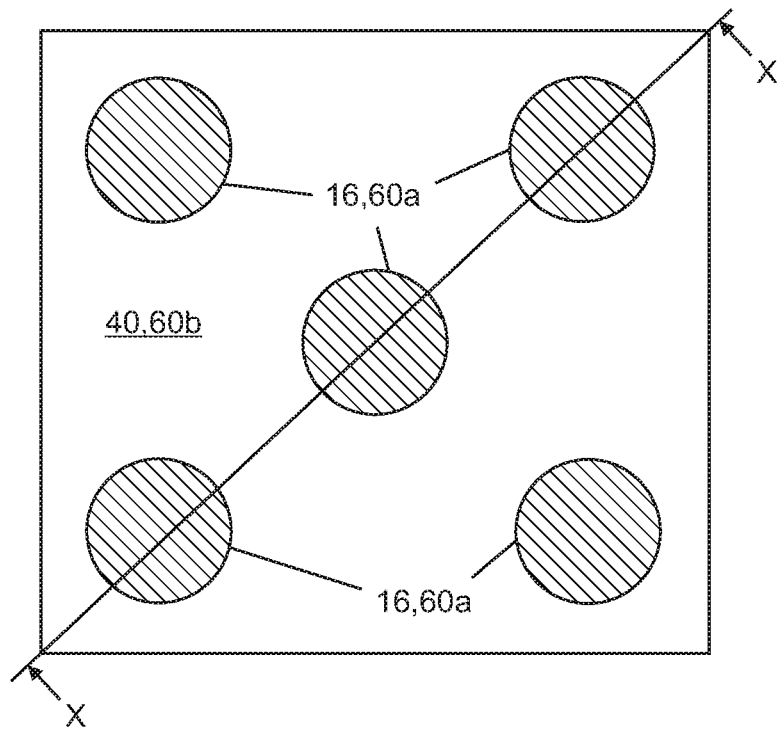
FIG. 11 shows the combination layer from FIG. 10 in a plan view.

FIG. 11 shows the combination layer 58 alone in plan view in the direction of the arrow XI in FIG. 10. The section line X, which indicates the course of the sectional representation in FIG. 10, is also shown.

The two layers, namely the fire-retardant layer 40 and the adhesive layer 16, are in each case not formed over the entire surface but are composed of partial surfaces 60*a,b*. Here, the partial surfaces 60*a* form the adhesive layer 16, and the (here single) partial surface 60*b* forms the fire-retardant layer 40. In other words, the partial surfaces 60*a* are provided as recesses in the fire-retardant layer 40 and are "filled" with adhesive of the adhesive layer 16. This ensures that the active layer 14 or the partial structure comprising the active layer 14 and the protective layer 42 (including the connecting adhesive layer 16) is sufficiently attached or adhesively bonded to the surface 10 of the base body 8 thanks to the further adhesive layer 16 in the partial surfaces 60*a* (the proportions thereof in the combination layer 58). The fire-retardant layer 40 alone, if it were formed over the entire surface, might not be able to achieve a correspondingly strong adhesive effect. The proportion of the adhesive layer 16 in the combination layer 58 thus serves to connect the respectively adjoining adjacent layers (base body 8 with surface 10/active layer 14). However, the remaining ("perforated") fire protection layer 40 in the form of the partial surface 60*b* is sufficient to achieve the desired fire retardation in the component 6.

The combination layer 58 has a thickness of approximately 500 μm. Here, the active layer 14 is a display film, in this case a non-self-luminous electronic ink, or alternatively a self-luminous OLED. Here, the adhesive layer 16 between the active layer 14 and the protective layer 42 is formed from transparent adhesive. Here, the protective layer 42 is made of glass, alternatively of scratch-resistant plastic, and has a thickness of less than 1 mm.

LIST OF REFERENCE SIGNS 2 passenger cabin
4 passenger aircraft
6 component
8 base body
10 surface
12 layer structure
14 active layer
16 adhesive layer
18,*a-c* surface section
20 colour-changing film
22 visible surface
24 passive film
26 light
28 luminous film
40 fire-retardant layer
42 protective layer
44 concealment layer
46 covering layer
48 touchpad layer
50 touch
52 input signal
54 luminous layer
56 section (base body, illuminated)
58 combination layer
60*a,b* partial surface
TG transmittance
RG reflectance

What is claimed is:

1. A component for a passenger cabin of a passenger aircraft,
    having a base body with a surface,
    and having a layer structure, which is applied to the surface and contains at least two layers in the form of at least one active layer and an adhesive layer arranged between the active layer and the surface,
    wherein the active layer contains at least one surface section which is formed from an electrically controllable color-changing film,
    wherein at least a part of the color-changing film forms a visible surface for the intended purpose in the passenger cabin, and
    wherein the layer structure contains a fire retardant layer.

2. The component according to claim 1, wherein the color-changing film is a passive film which can be changed in terms of its transmittance and/or reflectance for light, or a luminous film which emits light in a controllable manner.

3. The component according to claim 1, wherein the active layer contains a plurality of surface sections of color-changing films, said sections being arranged side-by-side.

4. The component according to claim 3, wherein at least two of the surface sections can be activated individually.

5. The component according to claim 1, wherein at least a part of the fire-retardant layer contains an ablatively fire-retardant material.

6. The component according to claim 1, wherein the fire-retardant layer and the adhesive layer form a common combination layer.

7. The component according to claim 1, wherein the combination layer contains partial surfaces arranged side-by-side, wherein at least one of the partial surfaces is at least one section of the adhesive layer and at least one of the partial surfaces is at least one section of the fire-retardant layer.

8. The component according to claim 1, wherein the layer structure contains a protective layer for the active layer.

9. The component according to claim 8, wherein, if present, the protective layer or the concealment layer is a final covering layer of the component.

10. The component according claim 1, Wherein the layer structure contains a concealment layer which at least temporarily hides the active layer.

11. The component according to claim 1, wherein the layer structure contains a touchpad layer, at which an input signal is available in response to touch or pressure.

12. The component according to claim 1, wherein the layer structure contains a luminous layer which emits light in a controllable manner.

13. The component according to claim 1, wherein the base body has at least one actively illuminated section at least on its surface.

14. The component according claim 1, wherein the component is an at least part of a side wall section, a ceiling section, a luggage bin, a room divider, a partition, a passenger service unit or a lighting unit.

* * * * *